Benjamin G. Fitzhugh.
Dumping Cart.
No. 119,976.  Patented Oct. 17, 1871.

Witnesses:
 West Wagner.
 Parker H. Sweet, jr.

Inventor:
 Benjamin G. Fitzhugh
 by Johnson, Klaucke & Co.
 his attorneys

AM. PHOTO-LITHOGRAPHIC CO. N.Y. (OSBORNE'S PROCESS.)

UNITED STATES PATENT OFFICE.

BENJAMIN G. FITZHUGH, OF FREDERICK, MARYLAND.

IMPROVEMENT IN DUMPING-CARTS.

Specification forming part of Letters Patent No. 119,976, dated October 17, 1871.

*To all whom it may concern:*

Be it known that I, BENJAMIN G. FITZHUGH, of Frederick, in the county of Frederick and State of Maryland, have invented a new and useful Improvement in Dumping-Carts or Wagons, of which the following is a specification:

My invention consists in so hinging the body of a cart or wagon on the axle that when a lever attached to the body is brought into strong frictional contact with the wheel the backing of the cart will tilt the body to the rear; also, in a peculiar manner of hanging and attaching the tail-board of the cart in such a way that when the body of the cart is tilted the tail-board will be held in the same vertical position while opening the rear of the cart, so as to enable the contents to be dumped; also, in a peculiar lever pivoted to the body of the cart in such a manner as to either lock or unlock the body on the cart, act as a brake, and also, by binding against the wheel or wheels, cause the tilting of the body of the cart when the latter is backed.

Figure 1:
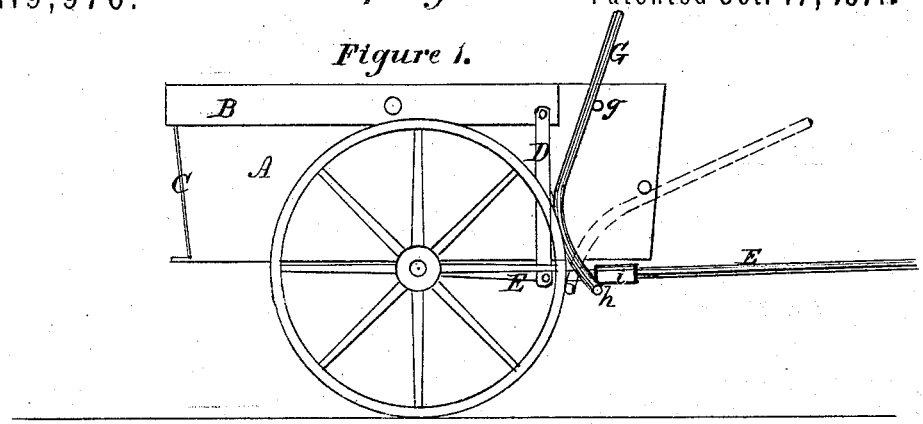
Figure 2:
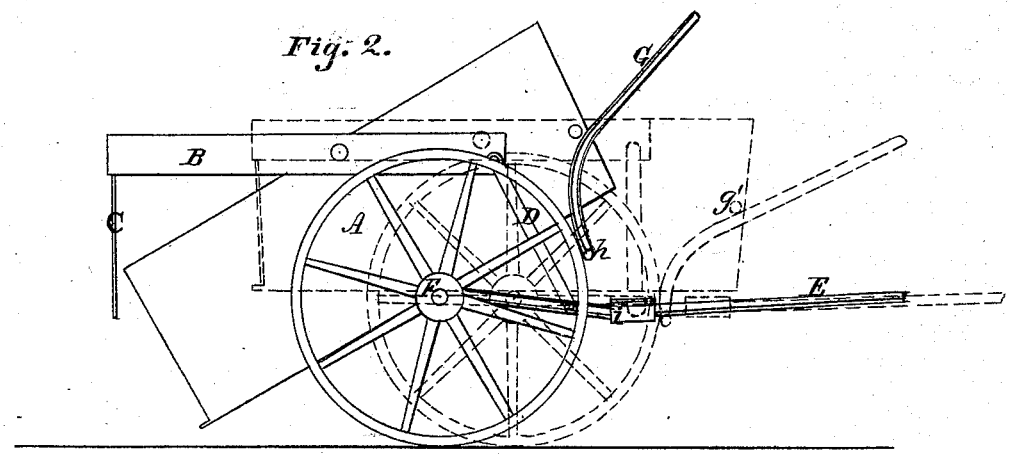
Figure 3:
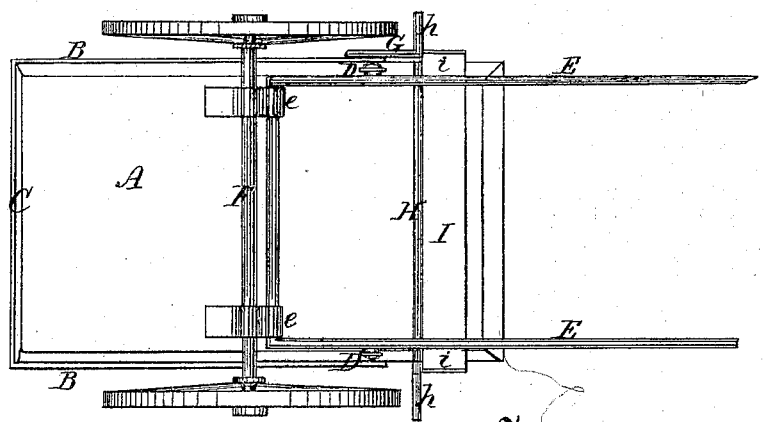

In the drawing, Figure 1 represents a side elevation of my improved dumping-cart. Fig. 2 is a similar view, the dotted lines illustrating the operation of dumping by tilting the body of the cart, and Fig. 3 is a bottom or under-side view of the same.

A is the body of the cart, consisting of the floor, the sides and front board, the tail-board C being detached and held between pieces B, which are pivoted on the outside near the center of the sides of the body A, in such a manner that when the cart is in position, as shown in Fig. 1, the tail-board C is held firmly against the end of body A, closing it. The forward ends of pieces B are pivoted to levers D, which in turn are with their lower ends pivoted to the draft-frame E. The body A of the cart is pivoted centrally, or nearly so, on the axle F, and is so balanced that a slight upward power exerted on its forward end will tilt it backward. The draft-frame E is suitably pivoted on bearings *e* forming part of or attached to the forward part of the bearings of the axle on the body A. It will be readily understood that when the body of the cart is tilted to dump the load the pieces B being held by their pivots to the body, move slightly backward, but being held at their forward ends by the levers D, which are again held to the draft-frame E, which latter remain stationary, they remain parallel to their position previous to the tilting, and hold the tail-board C in its normal vertical position, so that the rear of the cart is opened by moving the floor and end of the body down and away from the tail-board. G is a lever attached to a rod, H, which is pivoted to and extends across the under side of the body A, near its forward part. This rod H has at each side of the cart and extending across the periphery of the wheels a part, *h*, which extends downwardly, and is so arranged that when the lever G is thrown back, as shown in black lines in Fig. 1, and held in that position by means of a pin, *g*, or any equivalent device, the lower portions of the rod will seize under projections *i* formed on the draft-frame E; or which may be formed by the ends of a cross-board, I, on the draft-frame, on which the body A rests, and thus hold the front of the body firmly to the draft-frame, preventing its tilting. These portions *h* of the rod act as brakes when the lever G is released from the pin *g* and brought down to a position, as shown in dotted lines in Fig. 1, by reason of their coming into frictional contact with the periphery of the wheels; and this friction being in the line of motion of the wheel exerts a downward power upon the portions *h*, and thus prevents any accidental tilting while applying the brake.

The tilting of the body A of the cart is effected in the following manner: The lever G is moved downward, as shown in dotted lines in Fig. 2, until the portions *h* of rod H are in such firm frictional contact with the periphery of the wheels that they stop the wheels from turning forward, and thus firmly lock the body of the cart to the wheels, the lever G being held by a pin, *g'*, or other equivalent means. When the cart is backed, now, that portion of the wheels in contact with the parts *h* moves upwardly carrying with it the forward part of the body of the cart, and thus depressing its rear and discharging its load, for the tail-board is held aloft and suspended by the pieces B, as above described. The dumping being accomplished the cart is started forward, which brings the body level again, when the lever G is unlocked from pin *g*, and by being moved back until held by pin *g* the portions *h* are moved away from the periphery of the wheels and made to seize under the projections $i$, thus locking the forward portion of the body A to the draft-frame E.

I prefer making the tail-board C detachable from the pieces B, so that the cart may be used for timber, lumber, or similar articles, which extend beyond the length of the cart and to discharge which it is still desirable to dump the cart. In place of the pins $g\ g'$ I may use a toothed rack in the shape of a portion of the arc of a circle, into which may seize a projection on lever G, and I may use such lever on each side, or only on one side of the cart. It will be readily understood that by the use of my improvement the driver may remain on the draft-frame E all the time while dumping, as by means of the lever G he can accomplish the entire operation. The great advantage of my improvement is extreme simplicity, cheapness of construction, and its ready adaptability to dumping-carts now in use, no intricate machinery being required.

Having described my invention, I claim—

1. A dumping-cart so arranged that the tilting of the body is effected by backing the cart, substantially as described.

2. The combination of the pieces B and bars D with the tail-board of a dumping-cart, arranged to operate substantially as described.

3. The device G H $h$ $i$ when arranged so as to either lock the front of the body of the cart to the draft-frame or act as a brake, when desired, substantially as described.

4. The lever G and rod H $h$ when arranged to lock the front of the body of the cart to the wheels, so as to effect the tilting by means of frictional contact with the wheels in backing, substantially as described.

5. The brake device G H $h$ when so arranged that the frictional force of braking the wheels prevents the backward tilting of the body of the cart, substantially as described.

6. The combination of the tail-board C, pieces B, levers D, rod H $h$, lever G, projections $i$, and draft-frame E, with the wheels and body of the cart, all arranged to operate substantially as and for the purpose described.

B. G. FITZHUGH.

Witnesses:
JAS. H. STOKES,
N. M. STOKES. (31)